Patented Nov. 9, 1948

2,453,146

UNITED STATES PATENT OFFICE 2,453,146

PERFLUOROADIPIC ACID

Earl T. McBee, La Fayette, and Park A. Wiseman, West Lafayette, Ind., assignors to Purdue Research Foundation, West Lafayette, Ind., a corporation of Indiana No Drawing. Application October 27, 1945, Serial No. 625,108

1 Claim. (Cl. 260—537)

This invention relates to a novel organic compound designated as perfluoroadipic acid.

We have prepared this compound and have determined certain of its physical constants whereby it may be identified. The compound is a white crystalline solid, water-soluble and strongly acidic in nature. The compound is hygroscopic in character and, unless special precautions are taken, exists as a dihydrate, which does not exhibit a sharp melting point, rather fusing over a temperature range of several degrees. This perfluorodicarboxylic acid, octafluoroadipic acid, is particularly suited for use as an intermediate.

The compound may be prepared by reacting 1,2-dichlorooctafluorocyclohexene with an oxidizing agent at elevated temperatures for a period sufficient to allow complete oxidation of the chloro-substituted olefinic carbon atoms in the perhalocyclohexene. The resulting reaction product is concentrated, acidified with a strong inorganic acid and then extracted with an organic solvent, e. g., ether, to give a solution of perfluoroadipic acid.

The following example illustrates one method for the preparation of this new compound and is in no way to be construed as limiting the invention thereto:

Example

Perfluoroadipic acid was prepared in the following manner: Five hundred milliliters of water and 222 grams of 1,2-dichlorooctafluorocyclohexene were added to each of two separate three-liter, three-neck flasks. Potassium permanganate (235 grams) was added to each of these mixtures, slowly and with stirring. The reaction mixture was maintained at reflux temperature during the permanganate addition, and the oxidation was allowed to proceed as long as chlorine was evolved from the top of the condenser. The contents of the two flasks were then combined, steam distilled and 192.7 grams of the unreacted perhalocyclohexene recovered from the distillate. The material in the flask was made slightly alkaline with sodium carbonate, and sodium bisulphite, sufficient to destroy any unreacted permanganate ions, was added thereto. Manganese oxides and hydroxides present were removed by filtration and subsequently washed with dilute sodium bicarbonate solution. The substantially clear filtrate was evaporated to a volume of about 200 milliliters, acidified with fifty per cent sulfuric acid, and then filtered. Both the filtrate and precipitate were extracted exhaustively with ether. The ether extract was distilled, leaving a residue of 225 grams of the dihydrate of perfluoroadipic acid. The melting point of this crystalline, white, water-soluble acid was not sharp, the sample fusing slowly between 70 and 110 degrees centigrade. Upon recrystallization from benzene, similar melting point characteristics were exhibited. Agreement between theoretical and determined values for the neutralization equivalent as given below illustrates that the perfluoroadipic acid exists as the dihydrate.

| Compound | Neutralization Equivalent |
|---|---|
| Oxidation product of 1,2-dichlorooctafluorocyclohexene | 161.6 |
| Dihydrate of perfluoroadipic acid | 163.0 |

As a proof of structure, the diethyl ester of perfluoroadipic acid was prepared. The results of the analysis of this product proved conclusively that the compound isolated was perfluoroadipic acid. Analysis:

| Compound | Saponification Equivalent | Per cent Cl | Per cent F |
|---|---|---|---|
| Diethyl ester of oxidation product of 1,2-dichlorooctafluorocyclohexene | 169 | 0.0 | 45.7 |
| $C_2H_5O-\overset{O}{\overset{\|}{C}}-\overset{F}{\overset{\|}{\underset{\|}{C}}}-\overset{F}{\overset{\|}{\underset{\|}{C}}}-\overset{F}{\overset{\|}{\underset{\|}{C}}}-\overset{F}{\overset{\|}{\underset{\|}{C}}}-\overset{O}{\overset{\|}{C}}-OC_2H_5$ | 173 | 0.0 | 44.0 |

1,2-dichlorooctafluorocyclohexene may be prepared according to the method disclosed in the co-pending application of Earl T. McBee, Vincent V. Lindgren and Waldo B. Ligett, Serial Number 628,375.

We claim:

Perfluoroadipic acid, $HOOC-(CF_2)_4-COOH$.

EARL T. McBEE.
PARK A. WISEMAN.

REFERENCES CITED

The following references are of record in the file of this patent:

Henne et al.: J. Am. Chem. Soc., vol. 67, pages 1235–1237 (1945).

Baeyer et al.: Liebig's Annalen, vol. 256, page 27.

Zincke et al.: Berichte de Deutschen Chemischen Gesellschaft, vol. 25, page 2226.